United States Patent [19]

Ofer et al.

[11] Patent Number: 5,719,885
[45] Date of Patent: Feb. 17, 1998

[54] STORAGE RELIABILITY METHOD AND APPARATUS

[75] Inventors: Erez Ofer; Natan Vishlitzky, both of Brookline, Mass.

[73] Assignee: EMC Corporation, Hopkinton, Mass.

[21] Appl. No.: 579,707

[22] Filed: Dec. 28, 1995

[51] Int. Cl.$^6$ .................................................. G06F 11/10
[52] U.S. Cl. ................................. 371/40.1; 395/182.04
[58] Field of Search ..................... 371/40.1; 395/182.04

[56] References Cited

U.S. PATENT DOCUMENTS

| | | | |
|---|---|---|---|
| 4,388,684 | 6/1983 | Nibby, Jr. et al. | 364/200 |
| 4,562,578 | 12/1985 | Odaka et al. | 371/40 |
| 4,698,810 | 10/1987 | Fukuda et al. | 371/38 |
| 4,995,041 | 2/1991 | Hetherington et al. | 371/40.1 |
| 4,996,690 | 2/1991 | George et al. | 371/37.1 |
| 5,027,357 | 6/1991 | Yu et al. | 371/37.7 |
| 5,117,486 | 5/1992 | Clark et al. | 395/250 |
| 5,206,939 | 4/1993 | Yanai et al. | 395/400 |
| 5,289,478 | 2/1994 | Barlow et al. | 371/40.1 |
| 5,313,587 | 5/1994 | Patel et al. | 395/275 |
| 5,335,352 | 8/1994 | Yanai et al. | 395/800 |
| 5,361,266 | 11/1994 | Kodama et al. | 371/37.7 |
| 5,361,267 | 11/1994 | Gadiwala et al. | 371/40.1 |
| 5,404,361 | 4/1995 | Casorso et al. | 371/40.1 |
| 5,410,546 | 4/1995 | Boyer et al. | 371/37.1 |
| 5,455,939 | 10/1995 | Rankin et al. | 395/182.04 |
| 5,459,856 | 10/1995 | Inoue | 395/440 |
| 5,583,876 | 12/1996 | Kakuta | 371/40.4 |
| 5,600,783 | 2/1997 | Kakuta et al. | 395/182.04 |

*Primary Examiner*—Stephen M. Baker
*Attorney, Agent, or Firm*—Fish & Richardson P.C.

[57] ABSTRACT

A method and apparatus for improving the data storage reliability of a host computer writing to a disk storage device receive a plurality of blocks of data from the host computer and write the blocks of data, according to a selected format, in a high speed cache memory. The data blocks in cache memory are then written to the disk drive, the blocks having a defined size. A plurality of the blocks form a sector on the disk drive and a plurality of the sectors form a track on the disk drive. Writing to the disk includes, transparently to the host, the calculation and attachment to each block of an error correcting code value. When data is written to the data cache, there is generated and associated with each of a group of the blocks of data, from the host computer, a second error code. The second error code is stored at a physical location in the cache memory, and when written to disk, is further written at a location which is not in the same sector as any of the blocks with which the second codes are associated. In this way, the host to cache level communications acquires a higher degree of reliability than previously available for full block transfer under, for example, the UNIX operating system.

16 Claims, 4 Drawing Sheets

ID TABLE STRUCTURE

| NAME | SIZE | NOTES |
|---|---|---|
| ID_FLAG | BYTE | HOLDS INDICATION FOR TRACK IN CACHE |
| RECORD_COUNT | BYTE | |
| FMT_CODE | BYTE | ALWAYS 64 |
| TRACK_MIRROR_FLAG | BYTE | |
| CACHE_TRACK_POINTER | LONG | THIS IS THE POINTER TO THE CACHE SLOT |
| FIRST_NO_COMP_ID | BYTE | |
| BLOCK_COUNT | BYTE | ALWAYS 64 |
| TRACK_CRC | BYTE | HOLDS A CRC FOR THE TRACK TABLE ITSELF |
| HI_DL_PATT | BYTE | |
| VALID_SEC_CRC | BYTE | IDENTIFIES VALID SECTOR CRC |
| INVALID_SECS | BYTE | |
| Spare | BYTE | |
| Spare | BYTE | |
| * | | |
| CRC_BYTES | 8 BYTES | THESE ARE THE 8 SECTOR CRC BYTES |

FIG. 4

STORAGE RELIABILITY METHOD AND APPARATUS

BACKGROUND OF THE INVENTION

The invention generally relates to the mass storage reliability in a digital computer system, and more particularly, to the error correction and management of data between the host computer, cache, and storage mechanism.

Cache memory is typically used in data storage systems so that, under ordinary circumstances, a relatively large and slow main memory can be accessed at a relatively high rate. The cache memory is relatively small, compared to the memory storage system, but is a high speed memory, and stores at any given time a portion of the data stored in main memory. The data storage system also includes a cache directory or index of the data elements. The cache directory can be referenced to provide an indication of whether or not a particular data element is currently located in the cache memory, and if so, the present location of the data element in the cache memory.

The data storage system typically responds to data access requests from a host computer. The data access requests, which include both read and write requests, are directed from the host to the cache system using a channel director. When a data storage system having a cache memory receives a request to access the data, the cache directory is first inspected to determine whether the data element to be accessed resides in the cache memory. If it does, the data storage system accesses the data in the cache memory. If not, the data storage system can retrieve the data from the main memory. If the data element is likely to be used in the near future, the retrieved data is copied or "staged" into the cache memory. In the instance of a write request, the data from the host computer is written into the cache memory, as a temporary staging memory, from which the data is read to the mass storage devices, that is, the disk drives, by the disk director.

The data storage systems that use disk drives for main memory typically use a random access memory for the cache memory. In such a storage system, the data elements in the cache memory are often the logical tracks of data on the disk drives and these logical tracks are typically composed of a plurality of data blocks or records of data. Each data element can be stored in any one of the plurality of "slots" in the cache memory. The cache directory includes a directory entry or ID table for each data element of the disk drive system including both a pointer to the location in the cache at which the data resides (if it is in cache), as well as the identification of where in the disk drive the data element resides.

Typically, when data is written from the host computer to the cache memory for storage, the channel director adds to each block of data an error correcting code of some kind, for example, a CRC code, and can further add, a physical address identifying, for example, the cache address, the disk drive device number, cylinder number, and drive head number. The data block typically includes 512 bytes of data (the UNIX standard), eight blocks corresponding to a sector on the disk drive. Each track of the disk drive includes eight sectors, each cylinder includes 15 tracks, and the disk drive itself contains a plurality of cylinders. For example, a nine gigabyte drive will have 17,700 cylinders.

Since reliability and integrity of the data is of paramount importance in the disk drive storage system, error checking and/or correcting information is added at different stages of the read and write processes. Thus, as noted above the channel director which takes the data from the host and writes it to the cache memory for later retrieval by the disk director which writes the data to the disk drives, adds a CRC error correcting byte to each block of data, that is, to each typically 512 bytes of data (other block sizes can be used). The disk director then writes, typically, 8 blocks (one sector) to the disk drive. Eight sectors logically equal one track in cache. However, the disk director, as it copies information from the cache, according to prior systems, copies only the data and not the channel director created error correction code. On the other hand, the disk director calculates and stores with each 512 bytes of data, an error correction code (ECC) of its own to ensure the integrity of the data from the cache, to and from the disk drive itself. Correspondingly, when the disk director reads data from the disk drive, it checks the integrity of the read data based upon its own, previously attached, ECC, and further, when it places the data into the cache, it adds to the data the physical address and a CRC which is calculated anew by the disk director. The new CRC cannot be checked against any other, previously calculated, error correcting CRC code however. The channel director then when it reads the data from cache, can check against the newly generated CRC, but has no reference base to check against that new CRC, such as the error correcting CRC code which it originally calculated for the data when it was originally written into cache.

It would be advantageous for the channel director to have its own independent method for checking the integrity and reliability of the data which it provides to the data storage system. However, since the "blocks" written to the disk drive under UNIX must each contain 512 bytes, there is no room there for any additional error checking to be provided by the channel director, and accordingly, the channel director relies principally upon the reliability of the disk director error correction system. Not all storage systems operate precisely in this manner. For example, while a block in Unix has 512 bytes, a Unisys Mainframe block has 504 bytes in a fixed byte architecture. In this case, there is additional space for the channel director to add error correcting CRC data, which the disk director will treat as data when it unites its 512 byte blocks to disk.

SUMMARY OF THE INVENTION

The invention relates to a method and apparatus for improving the reliability with which a host computer writes to a disk storage device. The method features the steps of sending a plurality of blocks of data from the host computer to a channel director; writing the blocks of data, according to a selected format, in a cache memory; writing at least one block of data from cache memory to a disk drive unit, the blocks having a defined size and a plurality of the blocks defining a sector on the disk drive and a plurality of sectors defining a track on said disk. The disk writing step features the steps of calculating and attaching to each block an error correcting code value; and the cache writing further features generating and associating with a group of the blocks of data, from the host computer, a second error code, the second error code being stored in the cache memory and being written to said disk at a location on the disk drive which is physically separate from and not in the same sector as any of the blocks with which it is associated.

In a further embodiment, the method features writing the error codes in the cache memory in one of a plurality of ID tables, each ID table being associated with a different track of the disk drive.

In another aspect of the invention, the method features generating and associating with the blocks of data a CRC checking code as the second error checking code. In various aspects, the method further features writing a number of blocks from the host computer which is less than the number of blocks needed to form a sector, and wherein the method then generates a new sector CRC based on the combination of the block or chunk CRC values for the new blocks being written and the block or chunk CRC values of the other blocks needed to fill in the sector.

The apparatus of the invention relates to a channel director for receiving a plurality of blocks of data from the host computer and for storing the received blocks of data in a high speed cache memory. The apparatus also has a disk director for writing each block of data from the cache memory to the disk drive, the blocks having a defined size, and a plurality of the blocks forming a sector on the disk drive, and further, a plurality of the sectors defining a track on the disk drive. The apparatus further provides that the disk calculates and attaches to each block an error correcting code value. The apparatus features the channel director attaching to a group of the blocks of data, from the host computer, a second error code, the second error code being stored in the cache memory; and the disk director writing the second error codes on the disk drive at a location which is physically separate from, and not in the same sector as, any of the blocks with which the second codes are associated.

In the preferred embodiment of the invention, the number of blocks forming a sector is eight and the number of sectors forming a track is also eight. Fifteen tracks form a cylinder and each block has 512 bytes of data.

BRIEF DESCRIPTION OF THE DRAWING

Other features and advantages of the invention will be apparent from the following description taken together with the drawings in which:

FIG. 4 illustrates in detail the ID table in accordance with a preferred embodiment of the invention;

DESCRIPTION OF THE PREFERRED PARTICULAR EMBODIMENTS

Figure 1:
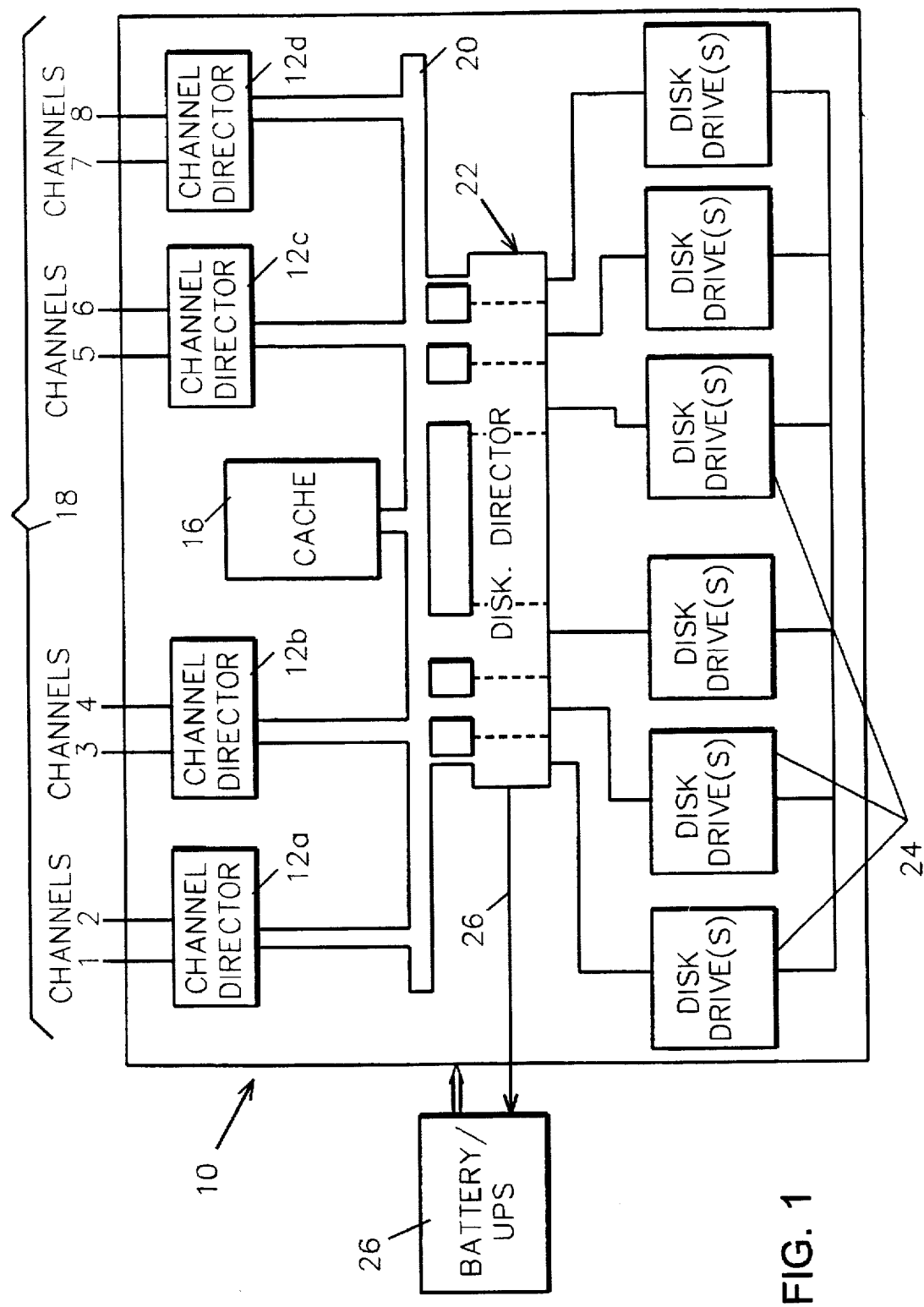
FIG. 1 is a block diagram of a preferred embodiment of the invention.

Referring to FIG. 1, a disk storage system 10 for disk mapping data retrieval includes one or more channel directors 12a, 12b . . . 12d for receiving write and read commands from a host computer (not shown), and either writing the data to a cache memory 16 or reading data from the cache memory (after sending a request for such data to the memory system, if necessary). The channel directors are adapted to receive disk read and write commands and data over channels 18 identified respectively as 1, 2, . . . 8 in FIG. 1. The channel directors 12 are connected to the cache memory storage unit 16 over a bus 20. Bus 20 also connects to each of one or more disk directors 22 which read and write data from and to one or more disk drive units 24 for interfacing with the cache memory 16.

Each of the disk drive units can include one or more disk drives depending upon the system requirements. Also included in the system are one or more uninterruptable power supplies 26.

In storing data that must be written to one or more of the disk drives 24, a channel director 12 updates, as required, an ID table, stored in the cache memory. A separate ID table is associated with each data track and the ID record must be written to disk by the disk director 22 each time it is modified. A more detailed description of the operation of a similar disk storage system is described in U.S. Pat. No. 5,206,939, assigned to the assignee of this patent application, granted Apr. 27, 1993, the disclosure of which is incorporated herein, in its entirety, by reference.

Figure 2:
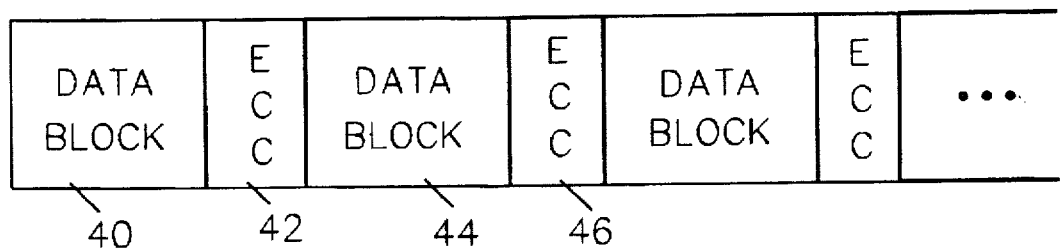
FIG. 2 represents the data pattern traditionally written to the disk drive.

Referring to FIG. 2, in normal operation, the disk as it writes data blocks to the disk drive unit, provides an error correcting code sequence which looks substantially as shown in FIG. 2. That is, the disk lays down a pattern on the magnetic media that includes a data block 40 followed by an error correcting code (ECC) 42, followed by a data block 44, followed by an error correcting code (ECC) 46, and so forth. The data read by the disk director from the disk drive unit, and loaded into cache memory, is checked by the disk director for accuracy and reliability. Typically, the disk director can correct one hard and one soft error in each block being read. Nevertheless, however, the channel director also performs its own error correcting operation in addition to whatever error correcting procedures are undertaken by the disk controller.

Figure 3:
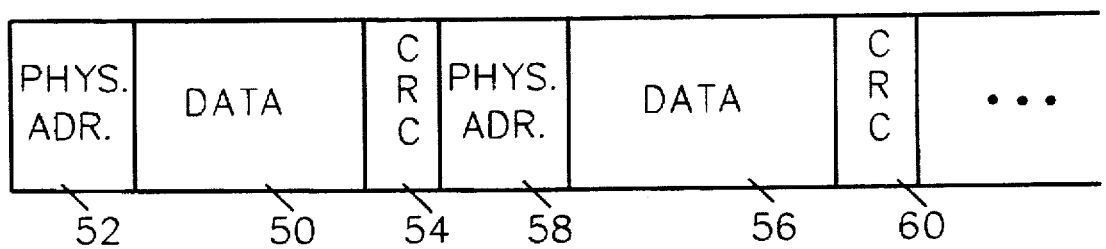
FIG. 3 is a typical writing structure in accordance with traditional concepts of writing from the host computer to cache.

Traditionally, the channel director would use an approach substantially the same as that used by the disk director, that is, referring to FIG. 3, the channel director would take a block of data 50 from the host, precede it with a physical address data 52, and follow it with an error correcting code 54, typically a CRC code 60, followed by the next block of data 56, and the next physical address 58 and CRC code 60, and so forth. Thus, each block would, in the prior art contain 512 bytes followed by one or more bytes of error correcting code such as the CRC code and preceded by a physical address. This information is stored in the data cache.

However, since the disk director writes data blocks of 512 bytes, it is not possible, efficiently, without unacceptably large overhead, to write to the disk drive the original 512 bytes of data along with the CRC error correcting code calculated by the channel director. Accordingly, therefore, when the disk director reads from data cache, it reads only the data portion of the information, both the physical address and the CRC being left unread by the disk director. The disk director therefore ignores the CRC calculation by the channel director, creates its own error correcting code (ECC), and uses its error correcting code to verify the accuracy and reliability of the data when it is read from the disk drive storage into the data cache. The disk director also, in these prior art systems, recreates the CRC's at the end of each block, and further provides the physical address information when it stores the data retrieved from the disk drive in the data cache. In other words, the data written by the disk director to cache matches the format in which the channel director writes to cache, but the physical address and CRC are new. The channel director, upon reading the data from the data cache, thus has no independent reference as to the accuracy of the data and must rely, if at all, on the CRC which had been written by the disk director after the data was read and verified by the disk director using its error correcting facility. This prior art system, thus requires at the end of each block, that time be taken by both the disk and the channel directors to both calculate and write the effect of h block. This has the effect of interrupting the normal fluid flow of data and decreasing somewhat the throughput of the memory system. It further fails to provide the channel director with an independent verification of the data which it had previously written to cache memory.

In accordance with the invention, referring to FIG. 4, the ID table, in addition to the data ordinarily stored in the cache memory for each track, further includes a sequence of bytes 66 representing error checking data associated with that track. In accordance with the preferred embodiment of the invention, the channel director, when it writes eight blocks to the data cache, calculates a CRC for the entire eight blocks and stores it in position 66 in the ID table, in a location corresponding to the sector (8 blocks) being written. A typical ID table is illustrated in FIG. 4. As a result, in accordance with the preferred and illustrated embodiment of the invention, the inventive memory system architecture provides, for each group of eight blocks of data sent from the host to cache memory, a single CRC byte, the CRC byte being an error check for all of the eight bytes being sent to cache. Thereafter, when the disk director writes that sector to the disk drive, it also writes the now changed ID table for that track.

Figure 5:
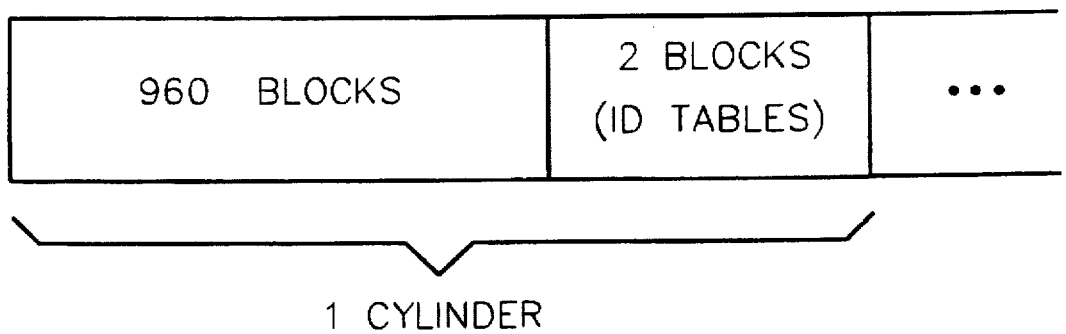
FIG. 5 is a typical writing sequence to disk in accordance with a preferred embodiment of the invention.

Referring to FIG. 5, there is illustrated the format provided at the disk drive in accordance with the invention. For each track, there corresponds an ID table (the contents of which are described in FIG. 4) and on the disk storage media, the write format takes 960 blocks (15 tracks or one cylinder), followed by two additional blocks, the latter two blocks containing the ID tables for the previously identified 960 blocks (15 tracks of 64 blocks each). Thus, when a track is read from the disk storage device, its corresponding ID table is also read by the disk director which in addition to storing the track in the appropriate slot of cache memory, also checks the ID table for that track to ensure that it is accurate. If necessary and appropriate, the ID table is rewritten using the ID table from the disk storage. Thus, a system is described in which the "signature" of the data is stored on the disk drive, and as importantly, is stored on the disk drive at a location which is separate from the data itself so that a local problem which involves the data will not affect the "signature" associated with that particular data or its track and which provides the channel controller with ability, and reliability, for recreating or at least identifying, data which may be an error.

Correspondingly, there is stored in the cache memory, for each group of 64 blocks (a track) an ID Table record as illustrated in FIG. 4. This ID table record (one ID table is stored in cache 16 for each track of the disk drives 24) records information regarding the track in a manner corresponding to the above mentioned U.S. Pat. No. 5,206,393. In accordance with the preferred embodiment of the invention, and as noted above, however, the ID track is modified so that it includes at 66, each of the eight CRC bytes which are associated with the particular track being stored or read.

In the preferred and illustrated embodiment of the invention, the ID table is provided for each of the 15 tracks associated with the cylinder, and each ID table stores the eight CRC's associated with the sixty-four blocks composing the track. In this manner, there is a better opportunity to both identify any possible errors in the read or write operation at the host to cache level as well as minimizing the number of error checking bytes being written to disk and the number of data flow interruptions being made during storage process.

It is further important to understand that not all hosts or protocols use eight blocks in a write request. When less than eight blocks are written, there results a "fragmented transfer" of data. UNIX is an example of an operating system that usually requires eight blocks from the host, but other data bases and protocols can use fewer than eight blocks (even though the storage system operates using eight block sectors). In this instance, care must be taken to ensure that the ID table for the newly written data remains accurate while at the same time minimizing calculations and interruptions to the data flow.

Two methods can be used according to the illustrated embodiment of the invention, to ensure that the ID table is accurate, either at the cache level, or at the disk drive. In accordance with a first method, when less than eight blocks are written to cache, the CRC for every newly written block is calculated and stored in cache. Then, if the entire sector were in memory prior to the writing of fewer than all the blocks by the channel director, the channel director calculates the CRC for each other block of data for the sector, and generates a new sector CRC for the entire sector, and writes that CRC to the ID table. This "effort" causes an interruption to the normal flow of data, and increases the calculations performed. The CRC for the eight blocks for each sector in the track table is thus corrected (since the original value is now incorrect) as the data is written into cache.

In accordance with the second method, when the channel director writes the blocks into cache memory, it also writes into a "partial CRC" location for that sector the CRC associated with the combination of the blocks which it has just written. Thus the channel director need not calculate the CRC on a block by block basis. Thereafter, the disk director, operates in one of two ways depending upon the state of the cache, for the read modify write, used by the system. According to the "first way", the disk director for the read modify write operation retrieves from disk, the blocks which are needed to be written to complete that sector (note that blocks cannot be written to those locations where new data has been written by the channel director) and calculates CRC's for each of the "chunks," that is, groups of data blocks being written. The CRC's for those chunks are then combined with the partial CRC to generate the resulting CRC for that sector. That value is placed both in the partial CRC location as well as in the track ID location 66 for that sector. In the situation where the track to be written to was already in the cache memory, the operation of the channel director is the same, that is, it generates a partial CRC for the blocks which it is writing. Thereafter, the disk director, when it reads that sector to write it to disk, calculates the CRC's for the chunks which have not been changed, combines it with the partial CRC, and stores the resulting value in both the partial CRC as well as the ID table for the track or sector being stored in memory, at the location of the sector which has been modified. Thereafter, in accordance with either method, since the ID table has been changed, it is written to the disk storage. As a result, both cache and disk storage contain both the ID table for the sector and track being written to.

Accordingly, therefore, the method of the invention operates with either the UNIX standard wherein the host usually reads and writes eight blocks at a time, or with write requests or protocols of less than eight blocks. The invention is also is not limited to either blocks of 512 bytes or formats requiring tracks to have 64 blocks.

Figure 6:
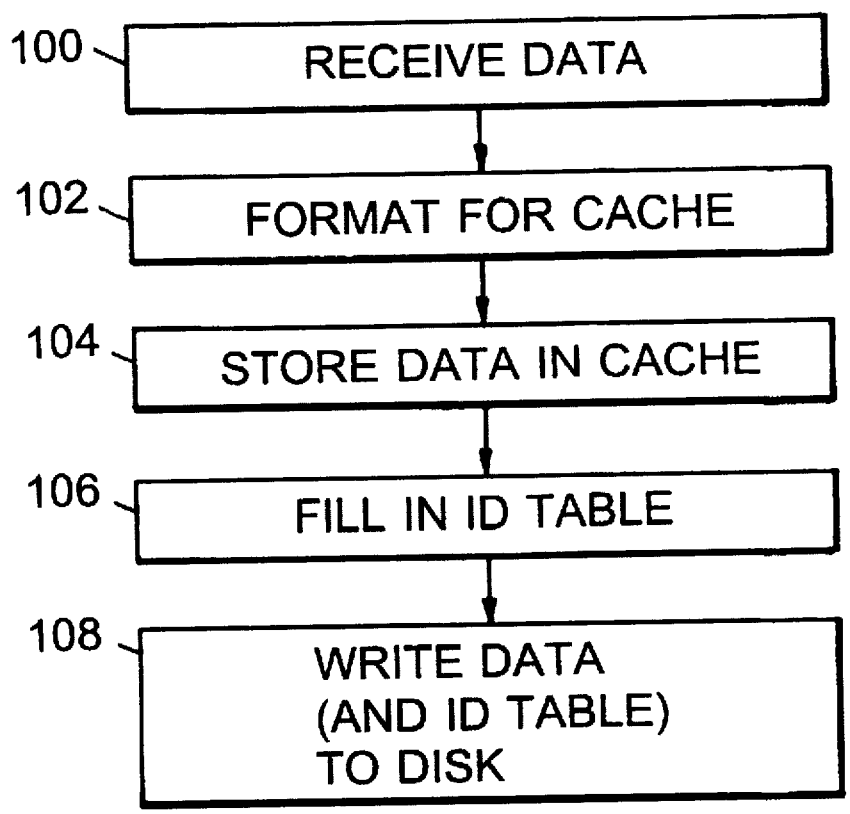
FIG. 6 is a flow chart illustrating operation of a preferred embodiment of the invention.

Referring to FIG. 6, in operation, the channel director receives a stream of data (at 100) from the host computer and formats the data, at 102, to form eight data blocks followed by a CRC error code and preceded by the physical address (FIG. 3). That data sequence is stored, at 104, in the appropriate cache slot. When the data is stored in cache, the ID table illustrated in FIG. 4, is filled in, at 106, for the sector of the track to which the data belongs. In particular, the read flag is set, the CRC byte(s) are adjusted for the blocks of the track being written into the cache, the cache track pointer is set, and various other necessary elements of the ID table structure are specified. Since in the preferred embodiment of the invention, the write operation is a read modified write, the cache may contain the entire track to which the data from the host is directed. Thereafter, the track and ID table, if necessary, are rewritten, at 108, to the disk drive by the disk director.

The invention provides a flexibility for handling any block size and in particular, reduces both the need for calculations as well as the unnecessary interruption of data flow from host to drive unit, while increasing reliability at the host to cache level of the storage process.

Modifications of the described embodiment of the invention will be apparent to those of ordinary practice in this field and are within the scope of the following claims.

What is claimed is:

1. A method for improving data storage reliability of a host computer writing to a disk storage device comprising the steps of sending a plurality of blocks of data from the host computer to a channel director, writing said blocks of data from the channel director, according to a selected format, in a cache memory, writing at least one block of data from said cache memory to the disk drive, said blocks having a defined size, a plurality of said blocks comprising a sector on said disk drive and a plurality of said sectors comprising a track on said disk drive, and said disk writing step including the step of calculating and attaching to each block an error correcting code value, wherein said cache writing step further comprises generating and associating with a group of said blocks of data from said host computer a second error code, said second error code being stored in said cache memory, and said disk writing step further comprises writing said second error codes to a location on said disk drive which is physically separate from and not in the same sector as any of the blocks with which said second codes are associated.

2. The method of claim 1 wherein each sector contains 8 blocks, and each track contains 8 sectors.

3. The method of claim 1 wherein said disk writing step comprises the step of writing to said disk in a format having fifteen consecutive tracks of data followed by two blocks which include at least an ID table for each of said tracks, said fifteen tracks and said two blocks forming one cylinder.

4. The method of claim 1 wherein said selected format comprises a plurality of ID tables, followed by a plurality of cache slots, each cache slot for storing a track of data.

5. The method of claim 1 further comprising the step of storing said second error codes in said cache memory in one of a plurality of ID tables, each ID table being associated with a different track of said disk drive.

6. The method of claim 5 wherein said cache writing step further comprises the step of generating and associating with the blocks of data a CRC check code as said second error code.

7. The method of claim 5 further wherein said sending step comprises the step of writing a number of blocks from said host computer which is less than the number of blocks needed to form a sector, and said cache writing step comprises the step of generating a CRC code for each block written to said cache and storing each thus formed block CRC in said cache, and further comprising the step of calculating the CRC for each other block of the sector to which said block CRC's belong, and wherein said generating and associating step comprises the step of determining the sector CRC for a said plurality of blocks from said block CRC's.

8. The method of claim 5 further wherein said sending step comprises the step of writing a number of blocks from said host computer which is less than the number of blocks needed to form a sector, and said cache writing step comprises the step of generating a CRC code for the collection of blocks written to said cache and storing said generated CRC in a partial CRC location in said cache memory, and further comprising the step of calculating group CRC's for chunks of the sector blocks which have not been overwritten during said cache writing step, and wherein said generating and associating step comprises the step of determining the sector CRC for said plurality of blocks from said partial CRC and said chunk CRC's.

9. An apparatus for improving data storage reliability of a host computer writing to a disk storage device comprising a channel director for receiving a plurality of blocks of data from the host computer and for storing said received blocks of data, according to a selected format, in a cache memory, a disk director for writing each block of data from the cache memory to the disk drive, said blocks having a defined size, a plurality of said blocks comprising a sector on said disk drive and a plurality of said sectors defining a track on said disk drive, said disk further calculating and attaching to each block an error correcting code value, and wherein said channel director attaches to a group of said blocks of data from the host computer a second error code, said second error code being stored in said cache memory, and said disk director writes said second error codes on said disk drive at a location which is physically separate from, and not in the same sector as, any of the blocks for which said second codes are associated.

10. The apparatus of claim 9 wherein each sector contains eight blocks, and each track contains eight sectors.

11. The apparatus of claim 9 wherein said disk director writes to said disk in a format having fifteen consecutive tracks of data followed by two blocks, said two blocks including at least an ID table for each of said tracks, said fifteen tracks and said two blocks forming one cylinder.

12. The apparatus of claim 9 wherein said selected format comprises a plurality of ID tables, followed by a plurality of cache slots, each cache slot storing a track of data, and there being one ID table for each of the tracks in the disk drive storage system.

13. The apparatus of claim 9 further wherein said channel director storing said second error codes in said cache memory in one of a plurality of ID tables, each ID table being associated with a different track of said disk drive.

14. The apparatus of claim 13 wherein said disk director generates and associates with the blocks of data a CRC check code as said second error correction code.

15. The apparatus of claim 13 further wherein said channel director writes a number of blocks from said host computer which is less than the number of blocks needed to form a sector, and generates a block CRC for each block written to said cache memory, said channel director storing each thus formed block CRC in said cache memory, said disk director calculates the CRC for each other block of said sector to which said block CRC's belong, and said disk director further determines the sector CRC for said plurality of blocks from said block CRC's, and writes said sector CRC in said cache memory.

16. The apparatus of claim 13 further wherein said channel director writes a number of blocks from said host computer which is less than the number of blocks needed to form a sector and generates a CRC code for the collection of blocks written to said cache, said channel director further storing said generated CRC code in a partial CRC location in said cache memory, said channel director further calculates group CRC's for chunks of the sector blocks which have not been overridden during the storage of said partial sector in said cache memory from the host computer, and said channel director determines the sector CRC for said plurality of blocks forming the sector from said partial CRC and said chunk CRC's.

* * * * *